(12) United States Patent
Khanu et al.

(10) Patent No.: US 10,232,857 B2
(45) Date of Patent: Mar. 19, 2019

(54) SYSTEM AND METHOD FOR DRIVING SCENARIO CONFIGURATION

(71) Applicant: Jaguar Land Rover Limited, Whitley, Coventry, Warwickshire (GB)

(72) Inventors: Hadric Khanu, Coventry (GB); Andrew Fairgrieve, Rugby (GB); Aaron Ward, Coventry (GB); Robert Burford, Winslow (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 23 days.

(21) Appl. No.: 15/303,417

(22) PCT Filed: Apr. 2, 2015

(86) PCT No.: PCT/EP2015/057301
§ 371 (c)(1),
(2) Date: Oct. 11, 2016

(87) PCT Pub. No.: WO2015/155113
PCT Pub. Date: Oct. 15, 2015

(65) Prior Publication Data
US 2017/0028996 A1    Feb. 2, 2017

(30) Foreign Application Priority Data
Apr. 11, 2014 (GB) .................................. 1406563.5

(51) Int. Cl.
*B60W 50/08* (2012.01)
*B60W 50/14* (2012.01)
(Continued)

(52) U.S. Cl.
CPC .......... *B60W 50/082* (2013.01); *B60K 35/00* (2013.01); *B60W 50/085* (2013.01);
(Continued)

(58) Field of Classification Search
None
See application file for complete search history.

(56) References Cited

U.S. PATENT DOCUMENTS

| | | | |
|---|---|---|---|
| 7,349,776 B2 | 3/2008 | Spillane et al. | |
| 8,447,460 B2 | 5/2013 | Nihei et al. | |

(Continued)

FOREIGN PATENT DOCUMENTS

| | | |
|---|---|---|
| CN | 101500828 A | 8/2009 |
| EP | 1355209 A1 | 10/2003 |

(Continued)

OTHER PUBLICATIONS

Combined Search and Examination Report for application No. GB1406563.5, dated Oct. 22, 2014, 8 pages.

(Continued)

*Primary Examiner* — Tamara L Weber
(74) *Attorney, Agent, or Firm* — Reising Ethington P.C.

(57) ABSTRACT

A system for a vehicle having at least one vehicle sub-system, the system being configured for determining a configuration of the sub-system. The system includes a user interface for receiving from a user an indication of a plurality of attributes indicative of off-road driving characteristics of a driving scenario, and a processor arranged to determine a configuration of the at least one vehicle sub-system based on the plurality of attributes of the driving scenario.

18 Claims, 4 Drawing Sheets

(51) Int. Cl.
*B60K 35/00* (2006.01)
*G07C 5/06* (2006.01)
*B60W 50/00* (2006.01)

(52) U.S. Cl.
CPC ............... *B60W 50/14* (2013.01); *G07C 5/06* (2013.01); *B60K 2350/106* (2013.01); *B60K 2350/1032* (2013.01); *B60W 2050/0067* (2013.01); *B60W 2050/146* (2013.01)

(56) References Cited

U.S. PATENT DOCUMENTS

| | | | |
|---|---|---|---|
| 9,415,779 B2 | 8/2016 | Popham et al. | |
| 2007/0265749 A1 | 11/2007 | Fitzgibbons | |
| 2010/0049408 A1 | 2/2010 | Abadie et al. | |
| 2012/0185135 A1* | 7/2012 | Sheriff | B60W 50/082 701/48 |
| 2014/0210608 A1* | 7/2014 | Yamada | G07C 5/00 340/459 |
| 2015/0203119 A1 | 7/2015 | Bird et al. | |
| 2016/0023657 A1 | 1/2016 | Fairgrieve et al. | |

FOREIGN PATENT DOCUMENTS

| | | |
|---|---|---|
| GB | 2492896 A | 1/2013 |
| GB | 2511867 A | 9/2014 |
| JP | H03189221 A | 8/1991 |
| JP | 2012006468 A | 1/2012 |
| WO | WO2009066143 A2 | 5/2009 |
| WO | WO2013120546 A1 | 8/2013 |
| WO | WO2014037541 A1 | 3/2014 |

OTHER PUBLICATIONS

Combined Search and Examination Report for application No. GB1505691.4, dated Oct. 1, 2015, 7 pages.
International Search Report for International application No. PCT/EP2015/057301, dated Aug. 13, 2015, 8 pages.
Written Opinion for International application No. PCT/EP2015/057301, dated Aug. 13, 2015, 8 pages.
Japanese Office Action in Japanese with English summary for JP application No. 2016-561709, dated Jan. 9, 2018, 7 pages.
Chinese Office Action corresponding to application No. 201580019244.7, dated Oct. 25, 2018, 17 pages.
Japanese Office Action with English summary corresponding to application No. JP 2016-561709, dated May 15, 2018, 8 pages.

* cited by examiner

SYSTEM AND METHOD FOR DRIVING SCENARIO CONFIGURATION

TECHNICAL FIELD

The present disclosure relates to a system and method for determining a configuration of at least one vehicle sub-system of a vehicle. Aspects of the invention relate to a system, to a method and to a vehicle.

BACKGROUND

Vehicles often comprise various sub-systems which are each operable in a variety of configurations. The configurations may each suit different driving conditions. For example, a vehicle may comprise a throttle control sub-system which is operable in a plurality of different modes each having a different response characteristic. The vehicle may also comprise a suspension control sub-system which may be operable in different modes relating to a height and response of the suspension.

It can be complex for a driver to configure a vehicle comprising different sub-systems to a particular driving scenario. The driving scenario, particular off-road driving, may encompass many different attributes relating to, for example, the surface type e.g. grass, snow, sand etc., surface conditions, surface topology etc., which may be difficult for a driver, particularly an inexperienced driver, to consider and configure the vehicle accordingly.

It is an object of embodiments of the invention to at least mitigate one or more of the problems of the prior art. It is an object of embodiments of the invention to facilitate configuration of a vehicle according to a driving scenario. It is an object of some embodiments of the invention to provide to a driver driving advice associated with a particular driving scenario. Other aims and advantages of the invention will be inferred from the following description, claims and drawings.

SUMMARY OF THE INVENTION

According to an aspect of the present invention there is provided a system for a vehicle having at least one vehicle sub-system, the system comprising a user interface means for receiving from a user an indication of a plurality of attributes of a driving scenario, and a processing means arranged to determine a configuration of the at least one vehicle sub-system based on the attributes of the driving scenario. The user interface means may comprise a plurality of user operable controls to each respectively receive an indication of a respective attribute of the driving scenario According to an aspect of the present invention there is provided a method of determining a configuration of at least one vehicle sub-system, comprising receiving, from a user, an indication of a plurality of attributes of a driving scenario, and determining a configuration of the at least one vehicle sub-system based on the attributes of the driving scenario.

According to an aspect of the present invention there is provided a system for a vehicle having at least one vehicle sub-system, the system comprising a user interface means for receiving from a user an indication of a plurality of attributes indicative of off-road driving characteristics of a driving scenario, and a processing means arranged to determine a configuration of the at least one vehicle sub-system based on the plurality of attributes of the driving scenario.

Advantageously, the selection of the configuration based on a plurality of attributes allows the configuration to be accurately determined.

The system may comprise a communication means for communicating the determined configuration to the at least one vehicle sub-system, such that the sub-system operates according to the configuration. The configuration may be used to operate the at least one sub-system appropriate for the driving scenario.

The characteristics may be indicative of one or more of: vehicle orientation, a surface type, surface conditions and surface topology; optionally the vehicle orientation is indicative of one or both of vehicle pitch and roll.

The user interface means may be arranged to output a graphical user interface (GUI) which may comprise a plurality of user operable controls to each respectively receive an indication of a respective attribute of the driving scenario.

The GUI may be configured to sequentially output a plurality of screens, each of said screens being configured to receive at least one of said user operable controls. Alternatively, the GUI may be configured to output a single screen comprising said plurality of user operable controls.

The processing means may be arranged to compare the determined configuration against a current configuration of the at least one sub-system and may determine whether it is necessary to change the configuration of the at least one sub-system. Advantageously, the configuration is only changed when necessary.

It may be necessary to change the configuration of the at least one sub-system when the current configuration does not match the determined configuration.

It may be necessary to change the configuration of the at least one sub-system when the current configuration does not have a predetermined degree of similarity to the determined configuration. Advantageously, the current configuration is only changed when the current configuration is unacceptable with respect to the determined configuration.

The predetermined degree of similarity may be determined as the current configuration being identified as at least one alternate configuration or being within a range of acceptable configurations for the at least one sub-system.

The system may comprise a data storage means for storing a data structure associating attributes of driving scenarios and configurations of the at least one vehicle sub-system, wherein the processing means is arranged to determine the configuration of the at least one vehicle sub-system using the data storage means.

The processing means may be arranged to retrieve from the data storage means the configuration of the at least one sub-system corresponding to the received plurality of attributes.

The data storage means may store information indicative of at least one alternate configuration or a range of acceptable configurations for the at least one sub-system.

The processing means may be arranged to provide an output indicative of the determined configuration of the at least one vehicle sub-system and to receive, via the user interface means, a user input indicative of an acceptance of the configuration.

The determined configuration may be communicated to the at least one vehicle sub-system in response to receiving the input indicative of the acceptance.

The processing means may be arranged to select driving advice media from amongst a library of driving advice media based on the attributes of the driving scenario.

The driving advice media may comprise one or more of textual information, one or more images and video information, providing driving advice to the user related to the driving scenario.

According to an aspect of the present invention there is provided a method of determining a configuration of at least one vehicle sub-system, comprising receiving, from a user, an indication of a plurality of attributes indicative of off-road driving characteristics of a driving scenario, and determining a configuration of the at least one vehicle sub-system based on the attributes of the driving scenario.

The method may comprise communicating the determined configuration to the at least one vehicle sub-system and operating the at least one sub-system according to the configuration.

The characteristics may be indicative of one or more of: vehicle orientation, a surface type, surface conditions and surface topology; optionally the vehicle orientation is indicative of one or both of vehicle pitch and roll.

The method may comprise outputting a graphical user interface (GUI) comprising a plurality of user operable controls, and receiving, via at least some of the controls, an indication of a respective attribute of the driving scenario.

The method may comprise comparing the determined configuration against a current configuration of the at least one sub-system and may comprise determining whether it is necessary to change the configuration of the at least one sub-system.

The method may comprise determining that it is necessary to change the configuration of the at least one sub-system when the current configuration does not match the determined configuration.

The method may comprise determining that it is necessary to change the configuration of the at least one sub-system when the current configuration does not have a predetermined degree of similarity to the determined configuration.

The predetermined degree of similarity may be determined as the current configuration being identified as at least one alternate configuration or being within a range of acceptable configurations for the at least one sub-system.

The determining the configuration of the at least one vehicle sub-system may comprise retrieving the configuration from a data storage means based on the plurality of attributes.

The method may comprise outputting an indication of the configuration of the at least one vehicle sub-system and receiving a user input indicative of an acceptance of the configuration.

The determined configuration may be communicated to the at least one vehicle sub-system in response to receiving the input indicative of the acceptance.

The method may comprise selecting driving advice media from amongst a library of driving advice media based on the attributes of the driving scenario.

The driving advice media may comprise one or more of textual information, one or more images and video information, providing driving advice to the user related to the driving scenario.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying figures, in which.

DETAILED DESCRIPTION

Embodiments of the invention are configured to receive, from a user of a vehicle, an indication of a plurality of attributes of a driving scenario and to determine a configuration of at least one vehicle sub-system based on the attributes.

Figure 1:
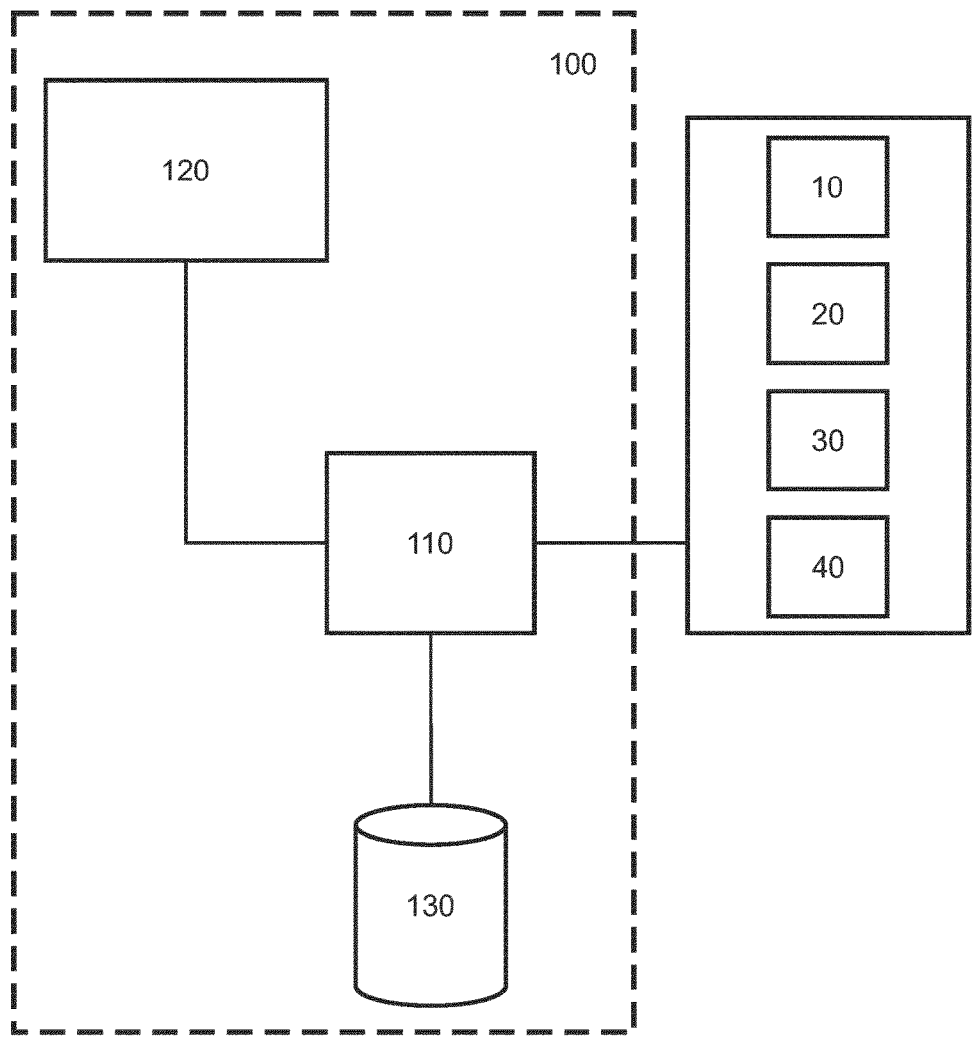
FIG. 1 shows a system according to an embodiment of the invention.

FIG. 1 illustrates a system 100 according to an embodiment of the invention. The system 100 is for use with a vehicle having at least one vehicle sub-system. The system 100 comprises a processing means 110, a user interface means 120 and a data storage means 130. The system 100 is communicably coupled to one or more sub-systems 10, 20, 30, 40 of the vehicle. The sub-systems 10, 20, 30, 40 may include, without limitation, a gearbox of the vehicle, a suspension system of the vehicle, a throttle system of the vehicle, an engine management system of the vehicle, a traction control system and a brake control system, such as an anti-lock brake control system. It will be realised that the sub-systems may include other sub-systems of the vehicle and, furthermore, whilst FIG. 1 illustrates there being four sub-systems this is merely illustrative and there may be more or less sub-systems. The system 100 may be communicatively coupled to the sub-systems by a communication means such as a communication bus of the vehicle. The communication bus may be a CAN bus or based on another communication protocol such as Ethernet or FlexRay as defined in ISO standards 17458-1 to 17458-5.

The user interface means 120 may be formed by a user interface device comprising an input device for receiving user input and an output device for outputting information to the user. The user input may be received responsive to touch, audibly or visually. The output may be a visual or audible output. The input and output devices may be integrated, such as into a touch-sensitive display device for outputting images to the user and receiving a user input responsive thereto at a location upon the display device. However it will also be realised that, in some embodiments of the invention, the user interface means may receive a user input in form of a voice command. For example the voice command may be indicative of an attribute of the driving scenario. Alternatively the user interface means may receive a user input in the form of a gesture or movement of a user's body-part such as a hand. For example the user may select from amongst a plurality of displayed attributes by moving their hand in proximity to the user interface means. The user input may be determined by the processing means based on image data of the user's movement such as from one or more cameras within the vehicle. For the purpose of illustrating the present invention a touch sensitive display device will be described, although it will be realised that this is merely exemplary.

In one embodiment the user interface means is controlled by the processing means to output a graphical user interface (GUI) comprising one or more user activatable controls. The user interface device is arranged to output information indicative of received user inputs, such as the controls activated by the user, to the processing means.

The processing means 110 may be formed by a processing device 110 which is arranged to execute instructions stored in a memory associated therewith. The instructions are arranged to perform a method according to an embodiment of the invention such as a method illustrated in FIG. 2. The processing means 110 is communicably coupled with the data storage means 130 storing a data structure associating attributes of one or more driving scenarios and configurations of the vehicle sub-systems 10, 20, 30, 40. The data storage means may be implemented by a database 130. The processing means 110 is arranged to determine the configuration of the at least one vehicle sub-system 10, 20, 30, 40 using the data storage means 130 based on the driving scenario attributes received from the user, for example by retrieving the configuration using the attributes as an index to the database 130.

The user interface device 120 is arranged to receive, from the user, an indication of a plurality of attributes of a driving scenario. A driving scenario relates to a situation which is, or will shortly be, encountered by the vehicle. In particular the driving scenario relates to off-road environmental conditions. The attributes are indicative of one or more of a surface type, surface conditions, surface topology and environment. It will be realised that these attributes are merely indicative and that other attributes may be considered.

In one embodiment the surface type attribute may be indicative of the type of surface or terrain which the vehicle is required to navigate and may be selected from amongst all or some of grass, gravel, mud, tarmacadam, rock and sand. It will be realised that embodiments of the invention may only include some of the above options, or may include alternative options.

In one embodiment the surface conditions may be indicative of a condition of the surface. The condition may indicate a weather-related condition of the surface. The conditions may comprise some or all of wet, dry, ice, snow, and waterlogged or wading.

In one embodiment the surface topology may be indicative of a topology of the surface such as smooth, compact, rough, loose, rutted or deep.

In one embodiment the environment may be indicative of a general environment of the driving scenario such as hilly or flat.

Further attributes of the driving scenario which may be considered relate to an orientation of the vehicle. The orientation may include one or both of a pitch and roll of the vehicle. The pitch of the vehicle is defined about a lateral axis i.e. nose up or down. The roll of the vehicle is defined about a longitudinal axis i.e. sideways rotation. The attributes relating to the orientation of the vehicle may be received from the user via the user interface device 120, or may be automatically determined by the processing device such as from one or more sensors of the vehicle. The one or more sensors may include a gyroscope associated with the vehicle.

Based on the attributes of the driving scenario the processing device 110 is arranged to determine a configuration of the at least one vehicle sub-system. The processing device may determine the configuration in combination with the database 130.

Figure 2:
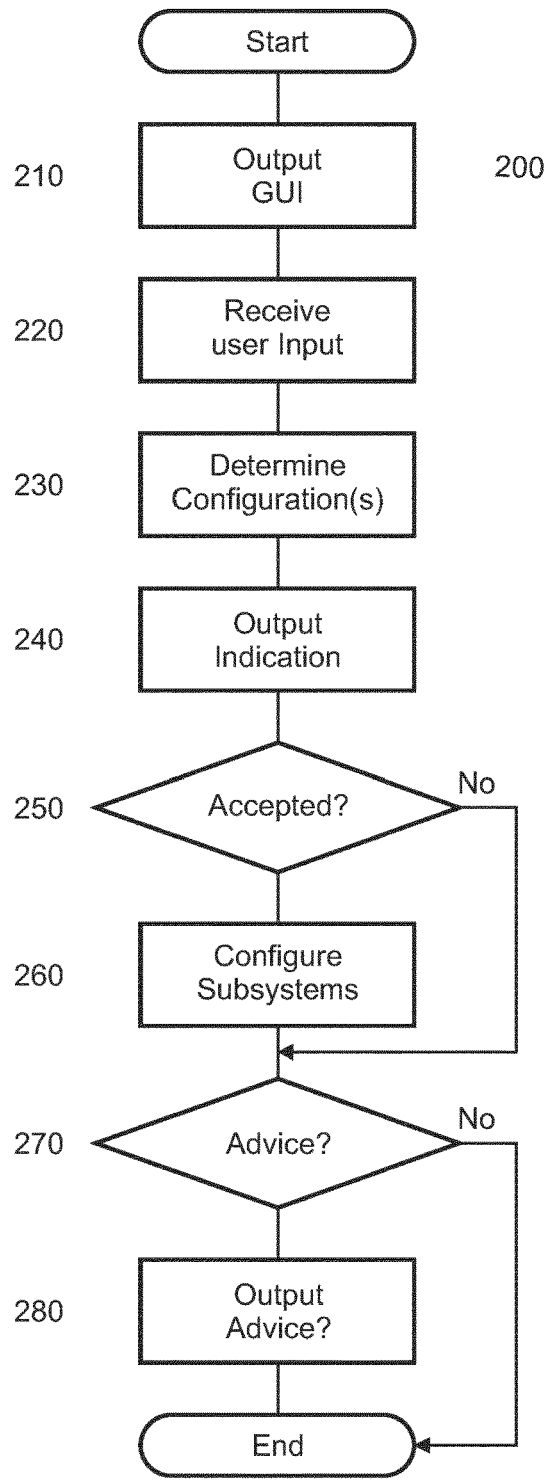
FIG. 2 shows a method according to an embodiment of the invention.

FIG. 2 illustrates a method 200 according to an embodiment of the invention. The method 200 may be performed by the system 100 illustrated in FIG. 1. The method will be described with reference to FIGS. 3 to 5 which show screenshots of a visual display device according to embodiments of the invention.

The method 200 comprises a step 210 of outputting a graphical user interface (GUI).

The GUI may be output by a display device forming part of the user interface device 120. The user interface device 120 is controlled to display the GUI by the processing device 110 communicating information thereto indicative of the GUI for display.

Figure 3:
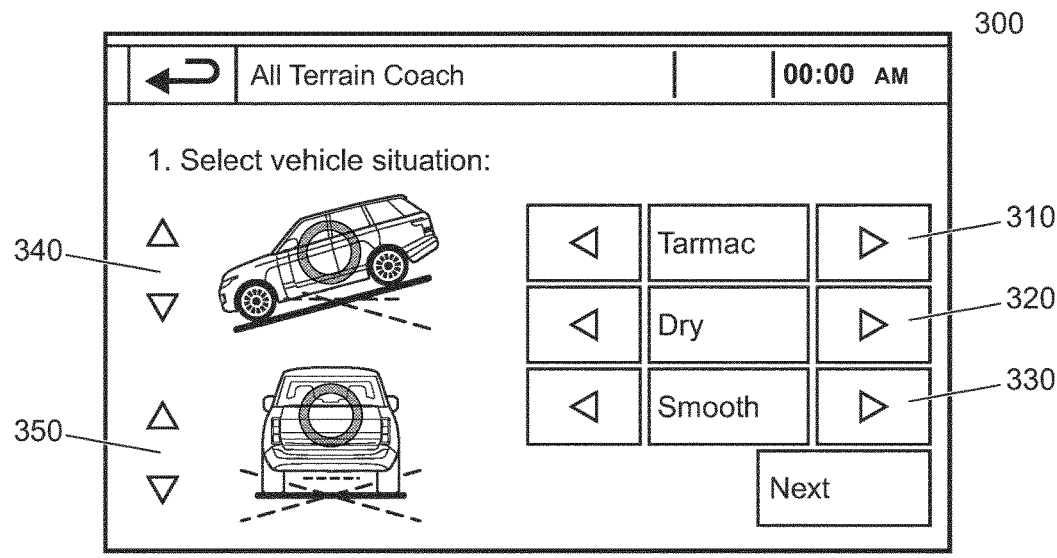
FIG. 3 shows a screenshot of a GUI according to an embodiment of the invention.

The GUI 300 may be as shown in FIG. 3. The GUI 300 comprises a plurality of user activatable controls 310, 320, 330, 340, 350 to input attributes indicative of the driving scenario.

The GUI 300 illustrated in FIG. 3 comprises a first control 310 indicative of the surface type attribute. The illustrated selected surface type shown in FIG. 3 is "tarmac" although it will be realised that this is merely exemplary. The first control comprises first and second arrow indicators which are operable responsive to the user's touch to select from amongst a plurality of surface types supported by the system 100. The surface types may comprise those noted above, although it will be realised that this is not limiting.

The GUI 300 illustrated in FIG. 3 comprises a second control 320 indicative of the surface conditions. The second control 320 comprises first and second arrow indicators which are operable responsive to the user's touch to select from amongst a plurality of surface conditions supported by the system 100. The surface conditions may comprise those noted above, although it will be realised that this is not limiting.

The GUI 300 illustrated in FIG. 3 comprises a third control 330 indicative of the surface topology. The third control 330 comprises first and second arrow indicators which are operable responsive to the user's touch to select from amongst a plurality of surface topologies supported by the system 100. The surface topologies may comprise those noted above, although it will be realised that this is not limiting.

The GUI 300 illustrated in FIG. 3 comprises a vehicle orientation portion 340, 350 indicative of the vehicle orientation. In particular, the GUI 300 illustrated in FIG. 3 comprises a portion indicative of the vehicle pitch i.e. nose up or down, and vehicle roll i.e. a lateral rotation of the vehicle. The vehicle orientation portion 340, 350 shown in FIG. 3 comprises first and second representations of the vehicle each indicative of one of vehicle pitch and vehicle roll from a representative viewpoint. The first representation 340 shown in FIG. 3 is indicative of the vehicle pitch and comprises first and second arrow indicators which are operable responsive to the user's touch to increase or decrease, respectively, the pitch of the vehicle. The second representation 350 shown in FIG. 3 is indicative of the vehicle roll and comprises first and second arrow indicators which are operable responsive to the user's touch to increase or decrease, respectively, the roll of the vehicle. The vehicle orientation, as shown in the GUI 300, may be determined from one or more sensors associated with the vehicle (not shown in FIG. 1). For example, an initial orientation (pitch and/or roll) may be determined from respective sensors responsive to the current orientation of the vehicle. The arrow indicators associated with the orientation portion 340, 350 may be controlled by the user to alter or adjust the orientation as determined by the sensors to be indicative of the driving scenario to be encountered by the vehicle. For example the determined orientation may be adjusted to be indicative of an upcoming incline which will be encountered in the driving scenario. Responsive to the user input the vehicle orientation shown in the GUI 300 changes to be indicative of the input orientation.

Although the GUI 300 illustrated in FIG. 3 shows a single GUI screen having a plurality of controls for receiving user inputs indicative of the vehicle situation, it will be appreciated that the system could alternatively be configured to sequentially display a plurality of different GUI screens, each GUI screen being configured to receive one or more user inputs indicative of the current vehicle situation. For example, a first screen may be configured to receive a user input indicative of a surface type, a second screen may be configured to receive a user input indicative of a surface condition, a third screen may be configured to receive a user input indicative of a surface topology and a fourth screen may be configured to receive a user input indicative of the orientation of the vehicle. After displaying the plurality of different GUI screens and receiving the respective user input on each screen the system may be configured to output a final screen showing the suggested configuration, which screen may be similar to that shown in FIG. 4, which is described in more detail below.

Returning to FIG. 2, the user input indicative of the driving scenario is received in step 220. As noted above, the user input may be received by sensing physical contact or a proximity of an input device, such as the user's finger, from the user at the user input device.

In step 230 a configuration of the one or more sub-systems 10, 20, 30, 40 of the vehicle is determined. The configuration is determined based upon the plurality of attributes of the driving scenario received in step 220. The processor 110 retrieves from the database 130 the configuration of the one or more vehicle sub-systems 10, 20, 30, 40. The processor 110 uses the plurality of attributes to look up a stored configuration in the database. For example, the configuration may be stored in the database 130 associated with the attributes "tarmac", "dry", "smooth" of the driving scenario as shown in FIG. 3. The configuration may also be associated with the inclination and roll attributes received in step 220. The configuration may determine, for example, a setting of a traction control system and an anti-lock braking system (ABS) of the vehicle, although it will be realised that this is merely exemplary and that the configuration of other sub-systems of the vehicle may be determined.

In step 240 an indication of the configuration determined in step 230 is output to the user. The indication of the configuration may be output by being displayed on the display device of the user interface 120. The configuration is displayed to the user as a recommended setting for the one or more vehicle sub-systems 10, 20, 30, 40 appropriate for the driving scenario.

Figure 4:
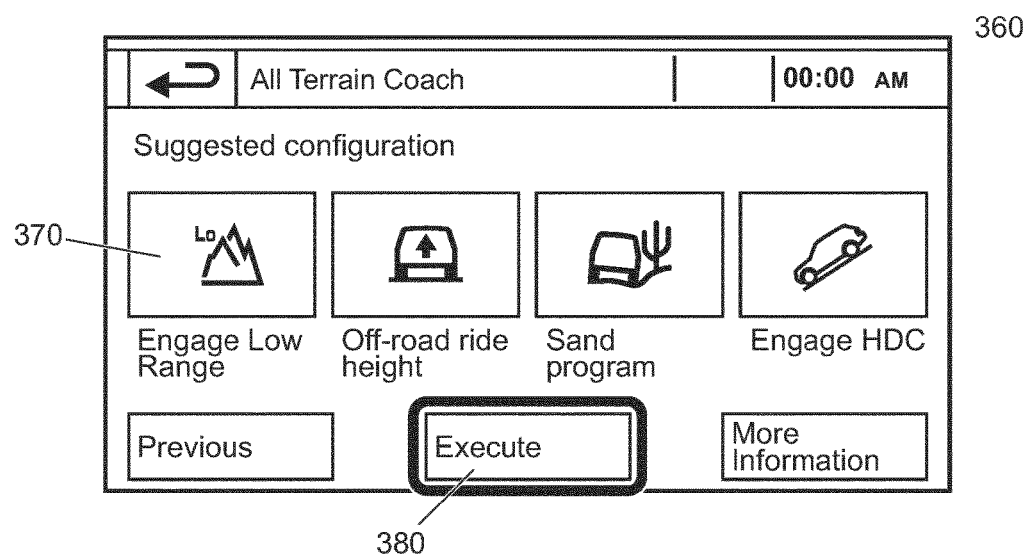
FIG. 4 shows a further screenshot of a GUI according to an embodiment of the invention.

FIG. 4 illustrates a GUI screen 360 providing the indication 370 of the configuration determined in step 230. The indication comprises a plurality of portions of the GUI each indicative of a configuration of a respective sub-system 10, 20, 30, 40. For example a first portion is indicative of a continuation of a gearbox, which may be a selection of a low or high-range gear system of the vehicle, a second portion may be an indication of a configuration of a suspension system of the vehicle, which may be a selection of a ride-height of the vehicle, a third portion may be indicative of a selected program, such as a program for driving on sand, which may include a configuration of a plurality of sub-systems such as the throttle and brake sub-systems, and a fourth portion may be indicative of a configuration of a hill-descent sub-system of the vehicle. It will be realised that the layout and choice of sub-systems illustrated in FIG. 4 is merely exemplary.

In step 250 it is determined whether the user has accepted the configuration the one or more vehicle sub-systems 10, 20, 30, 40 output in step 240. The output in step 240 may comprise a selectable graphical control which, when a user input is received corresponding to the control, is indicative of acceptance of the output configuration. For example, the GUI output in step 240 may comprise a button marked "Execute" 380 as shown in FIG. 4 which, when a user input is received corresponding to the location of the button, causes acceptance of the output configuration and the method moves to step 260.

The Execute control 380 may have a plurality of operative states, wherein the state is determined in step 250 depending on a current configuration of the vehicle's sub-systems 10, 20, 30, 40. A first operative state of the control 380 may be inactive i.e. it is not possible for the user to accept the currently displayed configuration of the sub-systems.

Step 250 may comprise a step of comparing the configuration determined in step 230 against a current configuration of one or more vehicle sub-systems 10, 20, 30, 40. If the determined configuration is the same as the current configuration then the control 380 may be inoperative. In an embodiment of the invention if the configuration determined in step 230 has a predetermined degree of similarity, with respect to at least some of the sub-systems 10, 20, 30, 40, to the current configuration, then the control 380 may also be inoperative. For example, the determined configuration of the suspension sub-system may be "normal ride height", such as suitable for a tarmac surface. If the current configuration of the suspension sub-system is "off road height", which is higher than normal ride height, then the current configuration may be deemed to be acceptable against the determined configuration for that sub-system. The configuration of each sub-system stored in the database 130 may be associated with information identifying other acceptable configurations, or a boundary of acceptable configuration ranges, for at least some of the sub-systems 10, 20, 30, 40. In step 250 an arbitration between the determined configuration and other acceptable configurations of those sub-systems 10, 20, 30, 40 may be performed. It will be noted that some sub-systems may be required to match the determined configuration, whilst other sub-systems may have other acceptable configurations for the plurality of attributes indicative of the driving scenario. The control 380 may be operative only when the current configuration of one or more sub-systems 10, 20, 30, 40 is not acceptable with respect to the determined configuration. The control 380 may indicate its operative nature in one embodiment by virtue of its colour i.e. being green when in an operative state.

Although not shown in FIG. 4, a further control may be displayed in step 240 indicative of the user's refusal to accept the displayed configuration which, when activated, causes the method to move to step 270 i.e. omitting step 260.

A control may also be provided to revert the configuration of the one or more sub-systems to a previous configuration or a default configuration. The default configuration may be, for example, a start-up configuration of the one or more sub-systems.

In step 260, following acceptance of the configuration by the user in step 250, information indicative of the configuration is communicated to each of the vehicle the one or more vehicle sub-systems 10, 20, 30, 40. The information may be communicated from the processor 110 to the one or more vehicle sub-systems 10, 20, 30, 40 via the communication bus of the vehicle. For example, information may be communicated from the processor to the traction control system of the vehicle indicative of a setting of the traction control determined to be appropriate for the driving scenario. The information is used by each of the respective sub-systems 10, 20, 30, 40 to configure the sub-system appropriately. Prior to the information indicative of the configuration being communicated step 260 may comprise a safety check step whereby the configuration is checked to ensure that the configuration of one or more safety-critical sub-systems 10, 20, 30, 40 is not to be changed to a potentially unsafe state. For example the configuration of the braking sub-system may be checked to ensure it continues to operate in a safe configuration.

In step 270 it is determined whether a user requests advice appropriate for the driving scenario. Step 270 may comprise receiving an indication from the user requesting driving advice, for example responsive to a displayed question. For example the GUI 300 may output a selectable control labelled "Advice?" although it will be realised that this is merely exemplary. If the user desires to receive driving advice they may activate the control which causes the method to move to step 280. If the user does not desire to receive driving advice, for example the user may activate a displayed control of the GUI labelled "No Advice", the method then ends.

If the user desires to receive driving advice, the method moves to step 280. Step 280 may comprise offering the user one or a plurality of driving advice media. The media may be appropriate for the driving scenario as indicated by the attributes of the driving scenario received in step 220. That is, the driving advice media may be selected from amongst a library of driving advice media based on the plurality of attributes of the driving scenario received in step 220. The processor may retrieve the one or more driving advice media from the database 130 based on the plurality of attributes. The driving advice media may comprise one or more of textual information, one or more images and video information. The driving advice media is intended to provide driving advice to the user related to the driving scenario.

Figure 5:
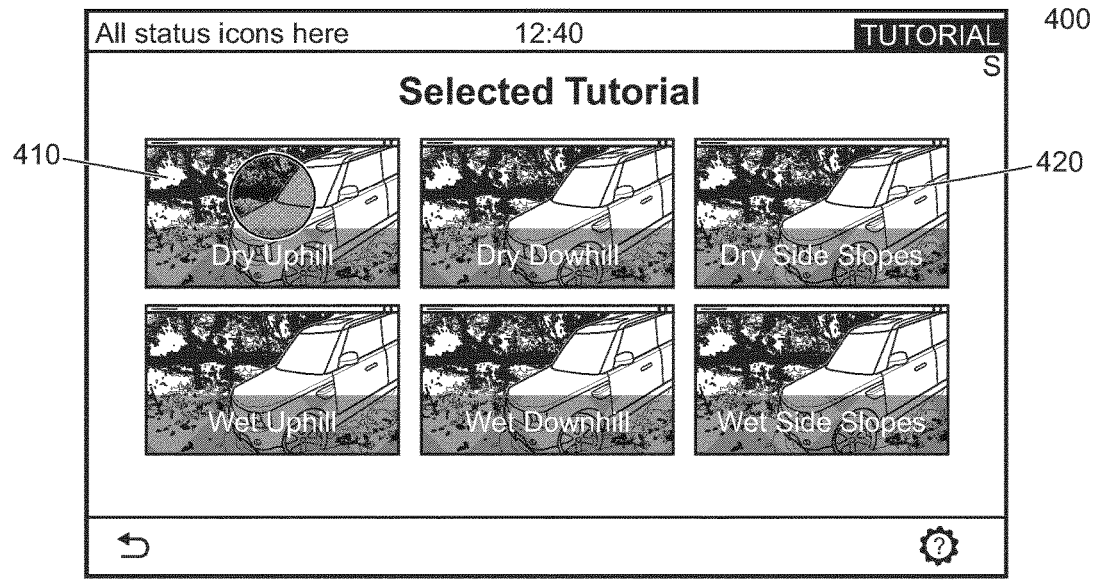
FIG. 5 shows another screenshot of a GUI according to an embodiment of the invention.
Figure 6:
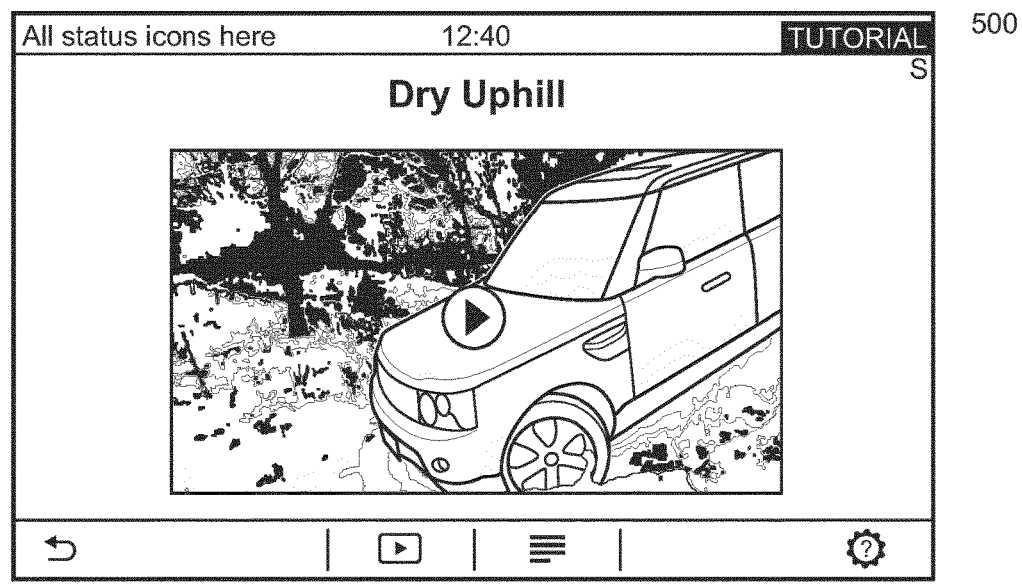
FIG. 6 shows a further screenshot of a GUI according to an embodiment of the invention.

Referring to FIG. 5, a screen 400 of the GUI is illustrated which provides the user with a plurality of items of driving advice media 410, 420, only some of which are given reference numerals for clarity. For example, first driving advice media 410 is provided which advises the user on navigating, or driving the vehicle across, a dry uphill. Similarly second driving advice media 420 is provided which advises the user on navigating dry side slopes. It will be realised that the driving advice media illustrated in FIG. 5 is merely exemplary. The user may select from amongst the plurality of displayed items of driving advice media to be provided with further advice related to the indicated conditions, such as by viewing video information. As illustrated in FIG. 6 the user may select from amongst the plurality of items of media 410, 420 displayed in FIG. 5 to be provided with the video information 500 as illustrated in FIG. 6. It will be realised that embodiments of the invention may omit the selection of driving advice media illustrated in FIG. 5 and may provide driving advice media as shown in FIG. 5 directly based on the attributes received in step 220.

It will be appreciated from the above that embodiments of the invention receive from a user an indication of a plurality of attributes of a driving scenario and determine a configuration of the at least one vehicle sub-system based on the attributes of the driving scenario. The at least one vehicle sub-system may be operated according to the determined configuration such that the vehicle operates appropriate for the driving scenario. Furthermore, in some embodiments, driving advice media may be provided to the user appropriate for the driving scenario.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A system for a vehicle having at least one vehicle sub-system, the system comprising:
   a user interface device comprising a plurality of user operable controls to each respectively receive an indication of a respective attribute of a driving scenario, whereby the user interface device is configured to receive from a user an indication of a plurality of attributes of the driving scenario; and
   a processor arranged to:

determine a configuration of the at least one vehicle sub-system based on the plurality of attributes of the driving scenario, wherein each of the plurality of attributes is indicative of a respective one of: a vehicle orientation, a surface type, a surface condition, and a surface topology;

provide an output indicative of the determined configuration of the at least one vehicle sub-system as a recommended setting for the at least one vehicle sub-system appropriate for the driving scenario;

receive, via the user interface device, a user input indicative of the acceptance or refusal of the configuration; and communicate information indicative of the determined configuration to the at least one vehicle sub-system to configure the sub-system appropriately following the acceptance of the determined configuration by the user.

2. The system of claim 1, comprising a communication device via which the processor can communicate the determined configuration to the at least one vehicle sub-system, such that the sub-system operates according to the configuration.

3. The system of claim 1, wherein the vehicle orientation is indicative of one or both of vehicle pitch and roll.

4. The system of claim 1, wherein the user interface device is arranged to output a graphical user interface (GUI), and wherein:

the GUI is configured to sequentially output a plurality of screens, each of said screens being configured to display at least one of said user operable controls, or the GUI is configured to output a single screen comprising said plurality of user operable controls.

5. The system of claim 1, wherein the processor is arranged to compare the determined configuration against a current configuration of the at least one sub-system and, based on the comparison, determine whether to change the configuration of the at least one sub-system.

6. The system of claim 5, wherein the processor determines to change the configuration of the at least one sub-system when the current configuration does not have a predetermined degree of similarity to the determined configuration.

7. The system of claim 1, comprising a data storage device for storing a data structure associating attributes of driving scenarios and configurations of the at least one vehicle sub-system, wherein the processor is arranged to determine the configuration of the at least one vehicle sub-system using the data storage device.

8. The system of claim 7, wherein the processor is arranged to retrieve from the data storage device the configuration of the at least one sub-system corresponding to the received plurality of attributes.

9. The system of claim 7, wherein the data storage device stores information indicative of at least one alternate configuration or a range of acceptable configurations for the at least one sub-system.

10. The system of claim 1, wherein the processor is arranged to select driving advice media from among a library of driving advice media based on the attributes of the driving scenario, and wherein the driving advice media comprises one or more of textual information, image information, and video information, providing driving advice to the user related to the driving scenario.

11. A vehicle comprising the system of claim 1.

12. The system of claim 1, wherein the processor is arranged to check the determined configuration to ensure that the configuration of one or more safety-critical sub-systems is not changed to a potentially unsafe state prior to communicating the information indicative of the determined configuration to the at least one vehicle sub-system.

13. The system of claim 12, comprising a communication device via which the processor can communicate the determined configuration to the at least one vehicle sub-system, such that the sub-system operates according to the configuration.

14. A method of determining a configuration of at least one vehicle sub-system, comprising:

receiving, from a user, via a user interface device, an indication of a plurality of attributes of a driving scenario, wherein the user interface device comprises a plurality of user operable controls each of which is configured to receive an indication of an attribute of the driving scenario, and further wherein each of the plurality of attributes is indicative of a respective one of: a vehicle orientation, a surface type, a surface condition, and a surface topology;

determining a configuration of the at least one vehicle sub-system based on the attributes of the driving scenario;

outputting an output indicative of the determined configuration of the at least one vehicle sub-system as the recommended setting for the at least one vehicle sub-system appropriate for the driving scenario;

receiving, via the user interface device, a user input indicative of the acceptance or refusal of the determined configuration; and communicating information indicative of the configuration to the at least one vehicle sub-system to configure the sub-system appropriately following the acceptance of the determined configuration by the user.

15. The method of claim 14, comprising operating the at least one sub-system according to the configuration.

16. The method of claim 14, wherein the vehicle orientation is indicative of one or both of vehicle pitch and roll.

17. The method of claim 14, comprising outputting a graphical user interface (GUI) comprising a plurality of user operable controls, and receiving, via at least some of the controls, an indication of a respective attribute of the driving scenario.

18. The method of claim 14, wherein the determining the configuration of the at least one vehicle sub-system comprises retrieving the configuration from a data storage device based on the plurality of attributes.

* * * * *